3,173,575
Patented Mar. 16, 1965

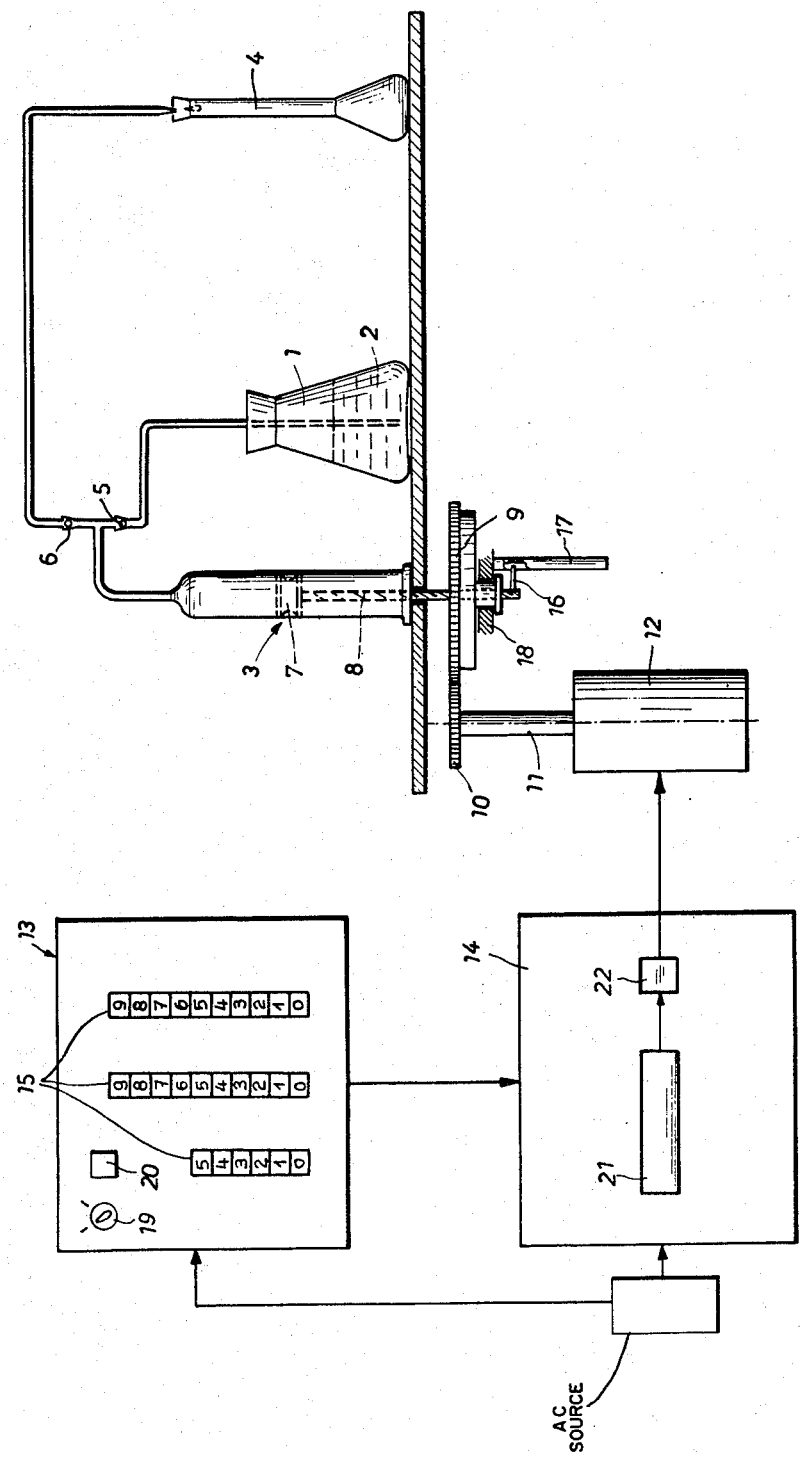

1

3,173,575
METHOD AND APPARATUS FOR MEASURING LIQUIDS
Ulrich Gugerli, Reinach, and Urs Vögeli, Neuallschwill, Basel, Switzerland, assignors to Sandoz A.G., Basel, Switzerland
Filed Jan. 10, 1962, Ser. No. 165,335
Claims priority, application Switzerland, Jan. 10, 1961, 261/61
5 Claims. (Cl. 222—1)

This invention relates to measuring the quantities of dispensed liquids.

It is known to furnish a visual control by virtue of which the quantity of dosed and dispensed liquids are measured by reading, for example, the height of a column of liquid contained in a pipette, or the length of stroke of a piston contained in a measuring cylinder with respect to a graduated scale. In this connection, however, comparatively wide tolerances must be allowed with regard to accuracy of reading and dosing, since the result may be inaccurate owing to various sources of error. The dosing of liquid, i.e. the withdrawal of a measured quantity of liquid represents a difficult and tedious task, when carried out according to conventional methods.

It is an object of the invention to provide a method and apparatus for dosing or measuring a liquid, in which first of all the necessity of reading is avoided and serious sources of error thus are eliminated.

A further object of the invention is the provision of a device of the type specified, in which owing to a particular construction and a novel method of measurement additional sources of error will be eliminated.

According to the invention there is provided apparatus comprising a piston burette driven backlashfree by a motor which is cut out after each dosing or measuring operation by adjustable control means responsive to a preselected number of revolutions of a rotatable driving member.

The present invention will now be described in more detail with reference to the accompanying drawing diagrammatically illustrating, by way of example, a preferred embodiment of a measuring device according to the invention.

The general problem to which the invention is directed is the withdrawing of a measured quantity of liquid from a stock solution 2 contained in an Erlenmeyer flask 1, and the filling of a measuring flask 4, by means of a piston burette 3. The quantity of liquid measured must be as accurate as possible. In conventional manner, the stock solution is sucked into the burette 3 through a suction valve 5 and then expelled into the measuring flask 4 through an outlet valve 6. As already mentioned, the dosage of the liquid is previously determined according to the displacement of the piston 7 moving within the piston burette 3.

In the example shown a piston rod 8 which is fixed against rotation by a pin 16 engaging a guide link 17, is formed as a threaded spindle extending through the hub of a gear wheel 9 which forms a spindle nut. The gear wheel 9 is rotatably mounted in a bearing 18 and meshes with a pinion 10 which is fixed on a shaft 11 of an electric motor 12. The mounting of the motor 12 is not shown in detail in the drawing.

It will be understood that upon rotation of the motor shaft 11 the piston 7 is displaced. If the connection between the shaft 11 and the piston 7 is substantially free from backlash, a predetermined angular movement of the shaft corresponds to a definite sliding movement of the piston, i.e. the same angular movement of the shaft 11 or wheel 9 always produces identical axial displacements of the piston 7. The number of shaft revolutions

2 thus represents a measure for the simultnaeously effected displacement of the piston and thus also for the liquid quantity displaced from the burette 3. The control of the movement of the piston based on the number of shaft revolutions, and thus the measuring or dosage of the liquid is extraordinarily accurate, since the transmission ratio between the motor 12 and the piston 7 can be selected comparatively high. It will be readily understood that by the use of a simple mechanism, the device according to the invention offers a very high accuracy even in cases where the number of shaft revolutions is determined by means of conventional expedients.

In the present case, however, the motor 12 is a synchronous motor which is connected via a control unit 13 to an alternating current source of constant frequency, for example to electric supply mains. The number of revolutions carried out per unit of time is known and constant for a synchronous motor, provided of course, the supply frequency is constant, so that the control of the piston movement according to the number of shaft revolutions, can be effected by the timing control of the motor operation, the amount of dosage being a function of the respective duration of operation. It will be understood, that with the high standards of modern techniques of time measurements, the available accuracy for the dosage solely represents a question of expense, while the dosing operation itself may easily be carried out in semi-automatic or fully automatic manner.

Preferably, the measurement of time is effected by counting the sequence of pulses of a constant frequency by means of a pulse counter. Basically, any sequence of pulses may be used, as long as the frequency remains constant. In the embodiment illustrated, however, the frequency of the alternating current supplying the synchronous motor 12 is counted advantageously by means of an electronic counter 14. Any possible errors thus are eliminated, which otherwise occur by fluctuations of the A.C. frequency and of the employed counting frequency.

The construction of the control unit 13 or the counter 14 can be clearly understood by one skilled in the art from the following explanations which particularly refer to the functioning of these two units. The control unit 13 is provided with push buttons 15, by means of which the particular desired quantity to be measured may be selected. Furthermore, there are provided the required switching members 19 for switching on or off the operating readiness or 20 for transmission of the starting command, after the desired quantity to be measured has been selected. The counter 14 comprises a setting counter 21 which releases a disconnector 22 after the preset counter value has been reached and thus terminates a dosing operation. When the starting member 20 is actuated after the desired amount of dosage has been set, the synchronous motor 12 starts to run, whereby the counter 21 counts the pulses of the supplied alternating current. When the preset counter value has been reached and the motor 12 disconnected, the quantity of liquid displaced by the piston 7 corresponds exactly to the desired and preset amount of dosage. According to a preferred construction of the device the arrangement is made so that upon selecting the prescribed dosage the counter 21 turns to a number complementary to the value selected with respect to the maximum value of the counter, for example a thousand. The counter after the starting command then begins counting until it reaches the maximum value and then a signal causes the stopping of the synchronous motor 12. As a concrete example, if said maximum value is one thousand, as stated, and the preselected number is $x$, the counter starts its operation at $1000-x$ and, upon reaching 1000, switches off the synchronous motor 12.

The device according to the invention can be provided with a rapid feed motion, in order to move the piston 7 to-and-fro several times in a quick movement prior to the dosing operation, in order to rinse the whole system thoroughly with the stock solution or with a solvent. The arrangement can be so that in starting or terminating the rapid movement the synchronous motor—if desired by a suitable coupling—is cut out or reset into operating readiness. The rapid feed motion may be controlled by preselecting keys, the piston 7 automatically carrying out a greater or smaller number of rapid strokes.

The above described apparatus is not subjected to the necessity of carrying out visual or manual control or checking operations, but performs the measuring operation with simple means according to preselected values in a fully automatic and extremely accurate manner.

We claim:

1. Apparatus comprising means adapted for containing a liquid means including a slidable piston in the first said means for displacing therefrom measured quantities of liquid in accordance with the amount of travel of the piston, means for driving said piston including a synchronous motor connected to an alternating current source of substantially constant frequency, counter means connected to said motor to count the number of cycles of the current source to the synchronous motor and control means connected to the counter means for preselecting the number of cycles to be counted and thereby establish a corresponding amount of travel of the piston, said counter means being effective to deenergize said motor when the number of cycles preselected by the control means equals the number of cycles counted by the counter means.

2. Apparatus as claimed in claim 1 wherein said counter means is a time measuring device and comprises a pulse counter which is supplied with a sequence of pulses of constant frequency corresponding to the frequency of the current source and disconnector means connected between said synchronous motor and said pulse counter for interrupting current supply to said motor when the pulse counter has received a number of pulses equal to the preselected number of cycles to be counted.

3. Apparatus as claimed in claim 1, wherein the synchronous motor and the counter means are connected to the same source of alternating current.

4. Apparatus for dispensing measured quantities of liquid comprising a burette, a piston slidably supported in said burrette and adapted to dispense a quantity of liquid in accordance with the amount of travel of the piston in the burrette, means for driving said piston to dispense a quantity of liquid which is related to the amount of travel of the piston in the burette, said means for driving said piston including a synchronous motor connected to an alternating current source, counter means connected to said motor to count the number of cycles of the current source to the synchronous motor and control means connected to the counter means for preselecting the number of cycles to be counted and thereby establish a corresponding amount of travel of the piston, said counter means being effective to deenergize said motor when the number of cycles preselected by the control means equals the number of cycles counted by the counter means.

5. A method of supplying measured quantities of liquids comprising moving a piston in a vessel by driving the piston to displace quantities of liquid from the vessel related to the magnitude of movement of the piston, generating periodic pulses during movement of the piston and driving the piston for movement at a rate of speed determined by the rate of generating of the periodic pulses, controlling the magnitude of movement of the piston by terminating movement of the piston after a particular accumulated number of pulses have elapsed from the time of initial movement of the piston, said particular number of pulses being equivalent to the desired predetermined magnitude of movement of the piston and substantially irrespective of the rate of movement of the piston.

References Cited by the Examiner

UNITED STATES PATENTS 2,673,686　3/54　Hoffman _____ 235—132
2,966,175　12/60　Hyde _____ 222—76 X RICHARD C. QUEISSER, *Primary Examiner.*